(12) United States Patent
Ohji et al.

(10) Patent No.: US 6,565,825 B2
(45) Date of Patent: May 20, 2003

(54) POROUS ALUMINA FABRICATION PROCEDURES

(75) Inventors: Tatsuki Ohji, Aichi (JP); Zhen-Yan Deng, Aichi (JP)

(73) Assignee: Japan as represented by Secretary of Agency of Industrial Science and Technology, Tokyo (JP)

( * ) Notice: Subject to any disclaimer, the term of this patent is extended or adjusted under 35 U.S.C. 154(b) by 102 days.

(21) Appl. No.: 09/748,019

(22) Filed: Dec. 27, 2000

(65) Prior Publication Data

US 2002/0043734 A1 Apr. 18, 2002

(30) Foreign Application Priority Data

Aug. 30, 2000 (JP) ........................................ 2000-261350

(51) Int. Cl.⁷ .................................................. C01F 7/02
(52) U.S. Cl. ...................................... 423/625; 423/628
(58) Field of Search ................................ 423/625, 628; 501/80, 105

(56) References Cited

U.S. PATENT DOCUMENTS 4,390,456 A * 6/1983 Sanchez et al. ............. 423/628
4,444,899 A * 4/1984 Yamada et al. ............. 423/628
6,027,706 A * 2/2000 Pinnavaia et al. .......... 423/600

OTHER PUBLICATIONS

Zhen–Yan Deng, et al., Al$_2$O$_3$ Based Porous Ceramic Materials Fabricated by the Decomposition of Al(OH)$_3$, Summaries of Annual Meeting of the Ceramic Society of Japan, Mar. 21, 2000, p. 111.

* cited by examiner

Primary Examiner—Stanley S. Silverman
Assistant Examiner—Edward M. Johnson
(74) Attorney, Agent, or Firm—Oblon, Spivak, McClelland, Maier & Neustadt, P.C.

(57) ABSTRACT

This invention relates to a method of producing an alumina porous material using a mixed powder of alumina powder and aluminum hydroxide represented by the chemical formula Al(OH)$_3$ at different percentages as the starting material, comprising the steps of heating this mixed powder to decompose the aluminum hydroxide and further heat treating it within a temperature range of 1,000 to 1,600° C., and to the alumina porous material produced by the above-mentioned method with a porosity exceeding 40 volume % and its specific surface area of 8 to 40 m$^2$/g, and further to a filter and catalyst carrier that are obtained using this alumina porous material.

7 Claims, 3 Drawing Sheets

POROUS ALUMINA FABRICATION PROCEDURES

BACKGROUND OF THE INVENTION

1. Field of the Invention

The present invention relates to an alumina porous material and method of producing the same and in further detail, to an alumina porous material that shows a balance between porosity and specific surface area and mechanical strength and that comprises many micropores, has a high specific surface area and is high strength such that it is ideal when used for filters, catalyst carriers, etc. Additionally, the present invention relates to an alumina porous material having high strength and a method of producing thereof.

2. Description of the Related Art

Ceramic porous materials have excellent heat resistance, thermal shock resistance, chemical resistance, normal-temperature and high-temperature strength, light weight, etc., and have been an indispensable industrial material in the past in the form of various filters (gas separation, solid separation, bacteria elimination, dust elimination, etc.), catalyst carriers, acoustic materials, insulating materials, sensors, etc.

Nevertheless, there has recently been a demand for higher porosity, higher strength, and better heat resistance when used in filters and catalyst carriers, etc., and fulfilling this demand is proving difficult with conventional ceramic porous materials. The alumina porous materials that are used for various filters and catalyst carriers are mainly γ-alumina, but there is a problem in that γ-alumina goes through phase transition to the stable α-alumina phase at approximately 1,000° C., resulting in a marked drop in specific surface area and loss of its function as a catalyst carrier.

Therefore, there is a desire for the development of catalyst carriers with such excellent heat resistance that a high relative surface area can be expected, even at high temperature. Incidentally, it is already known that the temperature of conversion from γ-alumina to α-alumina changes markedly with the addition of oxide, etc., to γ-alumina, and in particular, there is a marked rise in the transition temperature and the high relative surface area of γ-alumina can be retained at a high temperature by adding silica to γ-alumina, as reported in "Thermal stabilization of an active alumina and effect of dopants on the surface area (B. E. Yoldas, Journal of Materials Science, 11, 465–470 (1976) ).

A variety of methods of producing alumina porous materials have been studied. Porosity and mechanical strength are affected by the sintering conditions of the sintering method. There is usually a dramatic drop in porosity of alumina with an increase in the sintering temperature. Therefore, sintering must be incomplete in order to retain porosity. However, it is difficult to control porosity, or mechanical strength decreases markedly making practical use difficult, with sintered compacts produced by these incomplete sintering methods.

As previously explained, attempts are being made to produce alumina porous materials by conventional incomplete sintering methods while adjusting the starting material composition, sintering conditions, etc., but it is difficult to balance porosity and specific surface area with mechanical strength. In particular, an alumina porous material having uniform pore diameter and high porosity and specific surface together with excellent mechanical properties is necessary when it is used as a filter or catalyst carrier.

Under such conditions, the inventors repeated intense research aimed at developing an alumina porous material having high porosity and high specific surface area and excellent mechanical properties in light of the above-mentioned conventional technology and discovered that the desired goal can be accomplished by using a structure wherein using a mixed powder of aluminum hydroxide mixed with alumina as the starting material, this mixture is heated to decompose the aluminum hydroxide and the product is further calcinated at a high temperature. They successfully completed the present invention as a result of further research.

SUMMARY OF THE INVENTION

The object of the present invention is to provide an alumina porous material with which pore diameter is controlled, porosity and specific surface area are high, and mechanical strength is excellent and to provide a method of producing thereof. This invention relates to a method of producing an alumina porous material using a mixed powder of alumina powder and aluminum hydroxide represented by the chemical formula $Al(OH)_3$ at different percentages as the starting material, comprising the steps of heating this mixed powder to decompose the aluminum hydroxide and further heat treating it within a temperature range of 1,000 to 1,600° C., and to the alumina porous material produced by the above-mentioned method with a porosity exceeding 40 volume % and its specific surface area of 8 to 40 $m^2/g$, and further to a filter and catalyst carrier that are obtained using this alumina porous material.

DETAILED DESCRIPTION OF THE INVENTION

The purpose of the present invention is to provide an alumina ceramic porous material having excellent mechanical strength while also having a sufficiently narrow pore diameter distribution and retaining high porosity and high specific surface area, as well as a method of producing the same and the use of the same.

The present invention for solving the above-mentioned subject comprises the following technical means:

(1) A method of producing an alumina porous material using a mixed powder of alumina powder and aluminum hydroxide represented by the chemical formula $Al(OH)_3$ at different percentages as the starting powder, comprising the steps of:

heating the molded article of the same starting powder to decompose the aluminum hydroxide and further calcinating it at a temperature of 1,000 to 1,600° C.

(2) The method of producing an ceramic porous material according to (1) above, wherein the material contains 1 to 20 volume % aluminum hydroxide and, when necessary, zirconia, as its ceramic components other than alumina, which is the main component.

(3) The alumina porous material, said material is produced by the method defined in (1) or (2) above, and its porosity exceeds 40 volume % and its relative surface area is 8 to 40 $m^2/g$.

(4) The alumina porous material according to (3) above, wherein the material has a pores structure having at least one pore distribution peak within the range of 10 to 1,000 nm.

(5) The ceramic porous material according to (3) or (4) above, wherein the alumina phase composition is α and θ and the ceramic porous material has high porosity, high relative surface area and high strength as a result of controlling θ—α phase transition by adding a second phase.

(6) A filter, which is obtained using an alumina porous sintered material obtained by the production method in (1) or (2) above.

(7) A catalyst carrier, which is obtained using an alumina porous sintered material obtained by the production method in (1) or (2) above.

DESCRIPTION OF THE PREFERRED EMBODIMENTS

Figure 1:
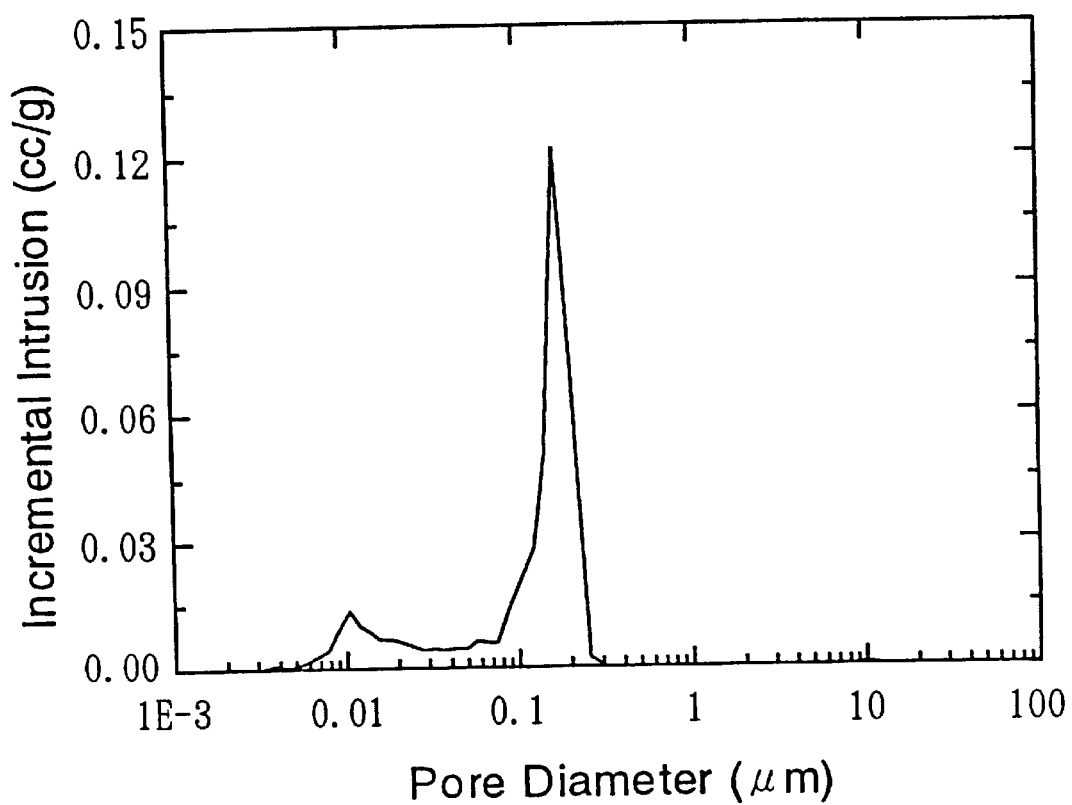
FIG. 1 shows the pore diameter distribution of sample No. 16 of Example 1.

The present invention will now be explained in further detail:

The method of producing an alumina porous material related in the present invention is characterized in that a mixed powder of alumina/aluminum hydroxide is used as the starting material and this is heated to decompose the aluminum hydroxide and then further calcinated at a higher temperature.

Moreover, the present invention is characterized in that a molded article is made from the above-mentioned mixed powder, this molded article is heated to a temperature of 800 to 1,000° C. at a speed of 1 to 10° C./minute to decompose the aluminum hydroxide, and the product is further calcinated for 0 to 2 hours at a temperature of 1,000 to 1,600° C.

Furthermore, the ideal embodiment of the present invention is the addition of 1 to 20 wt % zirconia in the above-mentioned method.

Volume shrinks by decomposing the aluminum hydroxide and therefore, more pores are generated. As a result, a high sintering temperature is necessary in order to obtain a porous material of the same porosity when compared to the case where alumina powder only is the starting material. Moreover, alumina phase transition is controlled by adding zirconia powder and an even higher sintering temperature becomes necessary.

Substance movement between particles is promoted with sintering at a high sintering temperature and development of a strong neck occurs. Therefore, an alumina porous material having high porosity and high specific surface area and excellent mechanical strength can be made.

Moreover, as a result of studying various factors pertaining to the effect of adding aluminum hydroxide and zirconia, such as the amount added controls porosity, specific surface area and pore diameter, etc., the inventors discovered that porosity, pore diameter, and specific surface area can be controlled by adding aluminum hydroxide and zirconia.

Thus, it is possible to obtain an alumina porous material that has high porosity and specific surface area, a narrow micropore diameter distribution, and excellent mechanical properties and heat resistance by the method of producing an alumina porous material related in the present invention.

When the method of the present invention is explained in further detail, the ceramic porous material of the present invention can basically be made by using commercial alumina powder and mixing aluminum hydroxide powder with a mean particle diameter of 2.0 μm or smaller and 0 to 10 volume % zirconia powder with this, molding the product, then heating this molded article at 800 to 1,000° C. in air to decompose the aluminum hydroxide, and further sintering at a temperature of 1,000° C. to 1,600° C. In this case, it is preferred that the temperature be low at 1,000 to 1,300° C. in order to obtain a higher specific surface area. It is preferred that the sintering temperature be 1,300° C. or higher in order to obtain higher strength. However, when the sintering temperature becomes higher, there is a reduction in porosity. The alumina powder should be of high purity. The mean particle diameter of the alumina powder is 0.05 to 2 μm, ideally 0.1 to 1 μm. Moreover, the amount of aluminum hydroxide represented by $Al(OH)_3$ that is added is 10 to 90%, ideally 60 to 80%.

Moreover, aluminum hydroxide powder with a mean particle diameter of 2.0 μm or smaller is used in order to make pore distribution uniform. The method of mixing the starting materials can be the wet method or the dry method, but the wet method is preferred. The metal mold molding method, casting molding, injection molding, cold hydrostatic molding, etc., are used for the molding method.

By means of the method of producing an alumina ceramic porous material of the present invention, γ-alumina is obtained by decomposing the aluminum hydroxide and γ→θ→α phase transition occurs, contributing to high porosity, high specific surface area and high strength. Furthermore, higher specific surface area can be obtained by controlling phase transition with the addition of zirconia.

The characteristic features of the alumina porous material produced by the method of the present invention (features not seen with conventional alumina porous materials) are listed below:

Porosity: Maximum of 65%

Specific surface area: Maximum of 40 $m^2/g$

Pore distribution peak: At least one pore distribution peak within the range of 10 to 1,000 nm and Distribution of pores with 10 nm or less.

Phase composition: α(+θ) composition with α and θ phases both present.

Strength: 50 MPa at porosity of 50%.

The alumina porous sintered compact of the present invention is useful as a filter or catalyst carrier using the above-mentioned features.

(Function)

The present invention is characterized in that the aluminum hydroxide is decomposed when it is heated and sintered and therefore, the sintered material is kept from becoming to a densified product. Moreover, fine γ-alumina is obtained by decomposing the aluminum hydroxide and this converts to the θ phase so that high specific surface area can be obtained.

The porous material of the present invention has many micropores of 2 μm or smaller and therefore, specific surface area is large. In addition, porosity is high. Therefore, there is an increase in the amount of fluid, such as gas, etc., that will pass through the material and it consequently has excellent function as a filter, catalyst carrier, etc. Moreover, since bending strength is relatively high, it has high reliability as a structural material.

Furthermore, it is preferred that fine alumina particles be distributed uniformly throughout the molded article of the mixed powder as a result of decomposing the aluminum hydroxide. Thus, an alumina ceramic porous material in which fine pores are uniformly distributed is obtained.

EXAMPLES

The present invention will be described below in specific terms using examples, but the present invention is in no way limited to these examples.

Example 1

(1) Determination Methods

1) Molded article density was calculated from its dimensions and weight.
2) Density and porosity of the porous sintered material were determined by the Archimedes method.
3) Pore diameter distribution was determined by the mercury intrusion method and specific surface area was determined by the BET method.
4) Crystal phase was identified by X-ray diffraction.
5) Bending strength was determined by the 3-point bending test method in conformance with JIS R1601 and the Young's modulus was determined by the ultrasound pulse method.
6) The state of the particles and pore structure of each sample were observed with a scanning electron microscope. Furthermore, Au and Pt were evaporated onto the samples when necessary.

(2) Method

Ten to 100 volume % aluminum hydroxide was added to alumina powder with a mean particle diameter of 0.2 μm (brand name TM-DAR, BET specific surface area of 13.6 m²/g) by wet mixing. This mixed powder was dried and then molded at 30 MPa to obtain a molded article with dimensions of 55 mm×12 mm×5 mm. Relative density of the molded article was 53%. This molded article was placed in an electric furnace and heated to 800 to 1,000° C. at 1 to 10° C./minute to decompose the aluminum hydroxide and then further calcinated for 0 to 2 hours at 1,000 to 1,600° C. The composition of the alumina porous material sample that was obtained, sintering conditions, and determination results for each property are shown in Table 1. Moreover, the pore diameter distribution of sample No. 16 is shown in FIG. 1. The alumina porous material from the present invention has a peak pore diameter near 200 nm and pores of 10 nm or less uniformly distributed as well.

TABLE 1

| Sample | Amount of Aluminum Hydroxide (volume %) | Sintering Temperature (° C.) | Phase Composition | Porosity (%) | Specific Surface Area (m²/g) | Bending Strength (MPa) | Young's Modulus (GPa) |
|---|---|---|---|---|---|---|---|
| 1 | 10 | 1100 | $\alpha\text{-}+\theta\text{-}Al_2O_3$ | 46 | 8.99 | 59.80 ± 8.14 | 42.03 |
| 2 | 20 | 1100 | $\alpha\text{-}+\theta\text{-}Al_2O_3$ | 47 | 10.43 | 55.52 ± 5.54 | 35.14 |
| 3 | 30 | 1100 | $\alpha\text{-}+\theta\text{-}Al_2O_3$ | 49 | 12.04 | 42.65 ± 5.50 | 28.54 |
| 4 | 40 | 1100 | $\alpha\text{-}+\theta\text{-}Al_2O_3$ | 50 | 14.29 | 44.22 ± 5.74 | 24.50 |
| 5 | 50 | 1100 | $\alpha\text{-}+\theta\text{-}Al_2O_3$ | 52 | 16.46 | 36.63 ± 3.26 | 18.74 |
| 6 | 60 | 1100 | $\alpha\text{-}+\theta\text{-}Al_2O_3$ | 53 | 19.41 | 35.31 ± 5.02 | 16.65 |
| 7 |  | 1150 | $\alpha\text{-}+\theta\text{-}Al_2O_3$ | 49 | 9.40 | 48.53 ± 10.25 | 25.77 |
| 8 |  | 1200 | $\alpha\text{-}+\theta\text{-}Al_2O_3$ | 43 | 6.14 | 90.04 ± 5.90 | 42.68 |
| 9 |  | 1250 | $\alpha\text{-}+\theta\text{-}Al_2O_3$ | 36 | 4.05 | 136.45 ± 13.82 | 84.95 |
| 10 |  | 1300 | $\alpha\text{-}Al_2O_3$ | 29 | 2.13 | 188.44 ± 12.14 | 149.62 |
| 11 |  | 1350 | $\alpha\text{-}Al_2O_3$ | 20 | 1.64 | 242.98 ± 29.69 | 212.62 |
| 12 |  | 1400 | $\alpha\text{-}Al_2O_3$ | 14 |  | 380.35 ± 22.81 | 262.94 |
| 13 |  | 1450 | $\alpha\text{-}Al_2O_3$ | 11 |  | 394.71 ± 52.33 | 302.52 |
| 14 | 70 | 1100 | $\alpha\text{-}+\theta\text{-}Al_2O_3$ | 56 | 21.44 | 32.87 ± 2.95 | 14.16 |
| 15 | 80 | 1100 | $\alpha\text{-}+\theta\text{-}Al_2O_3$ | 59 | 22.71 | 24.14 ± 3.99 | 10.25 |
| 16 | 90 | 1100 | $\alpha\text{-}+\theta\text{-}Al_2O_3$ | 62 | 29.53 | 17.27 ± 2.86 | 7.14 |
| 17 |  | 1150 | $\alpha\text{-}+\theta\text{-}Al_2O_3$ | 57 | 12.57 | 30.54 ± 1.18 | 14.34 |
| 18 |  | 1200 | $\alpha\text{-}+\theta\text{-}Al_2O_3$ | 54 | 6.63 | 45.04 ± 1.60 | 20.28 |
| 19 |  | 1300 | $\alpha\text{-}Al_2O_3$ | 46 | 3.89 | 80.56 ± 8.86 | 49.62 |

Example 2

Figure 2:
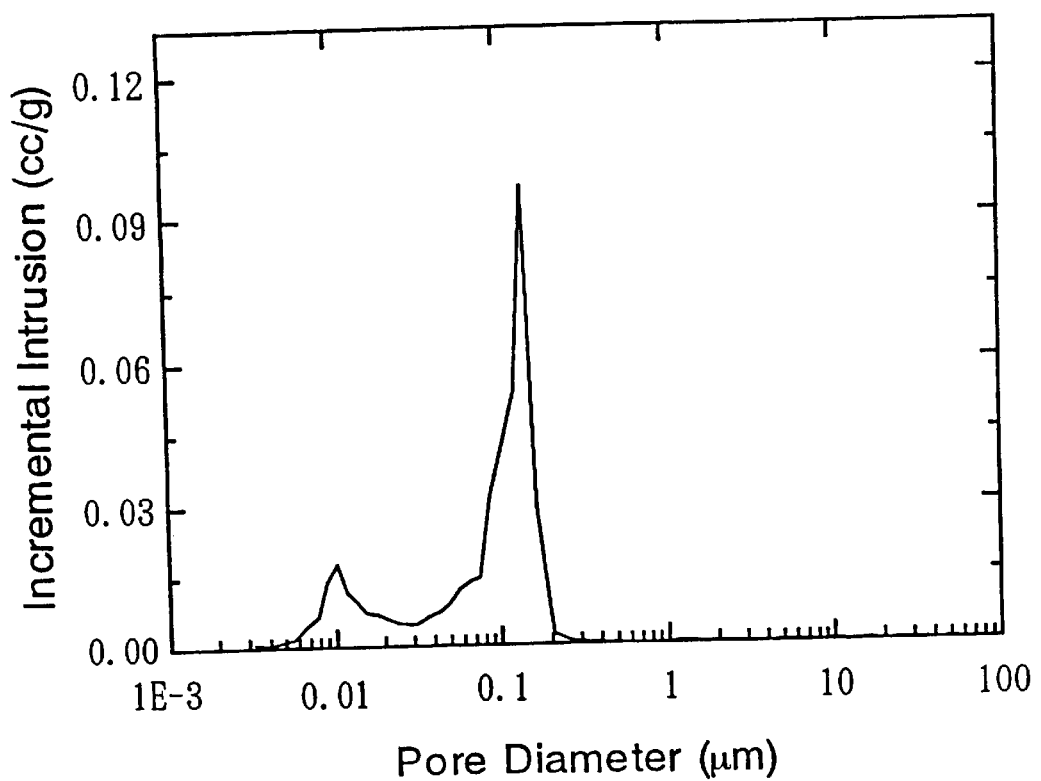
FIG. 2 shows the pore diameter distribution of sample No. 36 of Example 2.

Ten to 100 volume % aluminum hydroxide and 10 volume % zirconia powder (brand name TZ-3Y, BET specific surface area of 15.4 m²/g) were added to alumina powder with a mean particle diameter of 0.2 μm (brand name TM-DAR, BET specific surface area of 13.6 m²/g) by wet mixing. This mixed powder was dried and then molded at 30 MPa to obtain a molded article with dimensions of 55 mm×12 mm×5 mm. Relative density of the molded article was 53%. This molded article was placed in an electric furnace and heated to 800 to 1,000° C. at 1 to 10° C./minute to decompose the aluminum hydroxide and then further calcinated for 0 to 2 hours at 1,000 to 1,600° C. The composition of the alumina porous material sample that was obtained, sintering conditions, and determination results for each property are shown in Table 2. Moreover, the pore diameter distribution of sample No. 36 is shown in FIG. 2. The alumina porous material from the present invention has a peak pore diameter near 100 nm and pores of 10 nm or less uniformly distributed as well.

TABLE 2

| Sample | Amount of Aluminum Hydroxide (volume %) | Sintering Temperature (° C.) | Phase Composition | Porosity (%) | Specific Surface Area (m²/g) | Bending Strength (MPa) | Young's Modulus (GPa) |
|---|---|---|---|---|---|---|---|
| 20 | 10 | 1100 | α-+θ-Al$_2$O$_3$ | 51 | 10.90 | 33.07 ± 3.28 | 21.42 |
| 21 | 20 | 1100 | α-+θ-Al$_2$O$_3$ | 53 | 13.12 | 26.80 ± 2.60 |  |
| 22 | 30 | 1100 | α-+θ-Al$_2$O$_3$ | 54 | 15.11 | 21.95 ± 2.75 |  |
| 23 | 40 | 1100 | α-+θ-Al$_2$O$_3$ | 55 | 17.45 | 19.27 ± 1.67 |  |
| 24 | 50 | 1100 | α-+θ-Al$_2$O$_3$ | 57 | 20.01 | 15.64 ± 0.94 |  |
| 25 | 60 | 1100 | α-+θ-Al$_2$O$_3$ | 58 | 22.50 | 10.94 ± 1.17 |  |
| 26 |  | 1150 | α-+θ-Al$_2$O$_3$ | 57 | 13.80 | 12.70 ± 2.27 |  |
| 27 |  | 1200 | α-+θ-Al$_2$O$_3$ | 56 | 9.80 | 15.75 ± 1.85 |  |
| 28 |  | 1300 | α-+θ-Al$_2$O$_3$ | 54 | 7.54 | 32.42 ± 3.52 | 15.18 |
| 29 |  | 1350 | α-Al$_2$O$_3$ | 50 | 5.28 | 48.24 ± 1.89 | 27.12 |
| 30 |  | 1400 | α-Al$_2$O$_3$ | 37 | 3.54 | 94.54 ± 8.57 | 65.14 |
| 31 |  | 1450 | α-Al$_2$O$_3$ | 23 | 1.52 | 206.36 ± 24.58 | 157.36 |
| 32 |  | 1500 | α-Al$_2$O$_3$ | 12 |  | 327.74 ± 28.82 | 266.66 |
| 33 |  | 1550 | α-Al$_2$O$_3$ | 8 |  | 363.38 ± 51.81 | 315.49 |
| 34 | 70 | 1100 | α-+θ-Al$_2$O$_3$ | 61 | 25.90 | 11.30 ± 0.83 |  |
| 35 | 80 | 1100 | α-+θ-Al$_2$O$_3$ | 62 | 30.39 | 10.03 ± 0.23 |  |
| 36 | 90 | 1100 | α-+θ-Al$_2$O$_3$ | 65 | 36.39 | 8.53 ± 0.98 |  |
| 37 |  | 1150 | α-+θ-Al$_2$O$_3$ | 62 | 19.33 | 17.61 ± 1.04 |  |
| 38 |  | 1200 | α-+θ-Al$_2$O$_3$ | 60 | 10.43 | 20.87 ± 2.47 |  |
| 39 |  | 1300 | α-+θ-Al$_2$O$_3$ | 58 | 8.08 | 31.33 ± 1.45 | 13.34 |

Comparative Example

Figure 3:
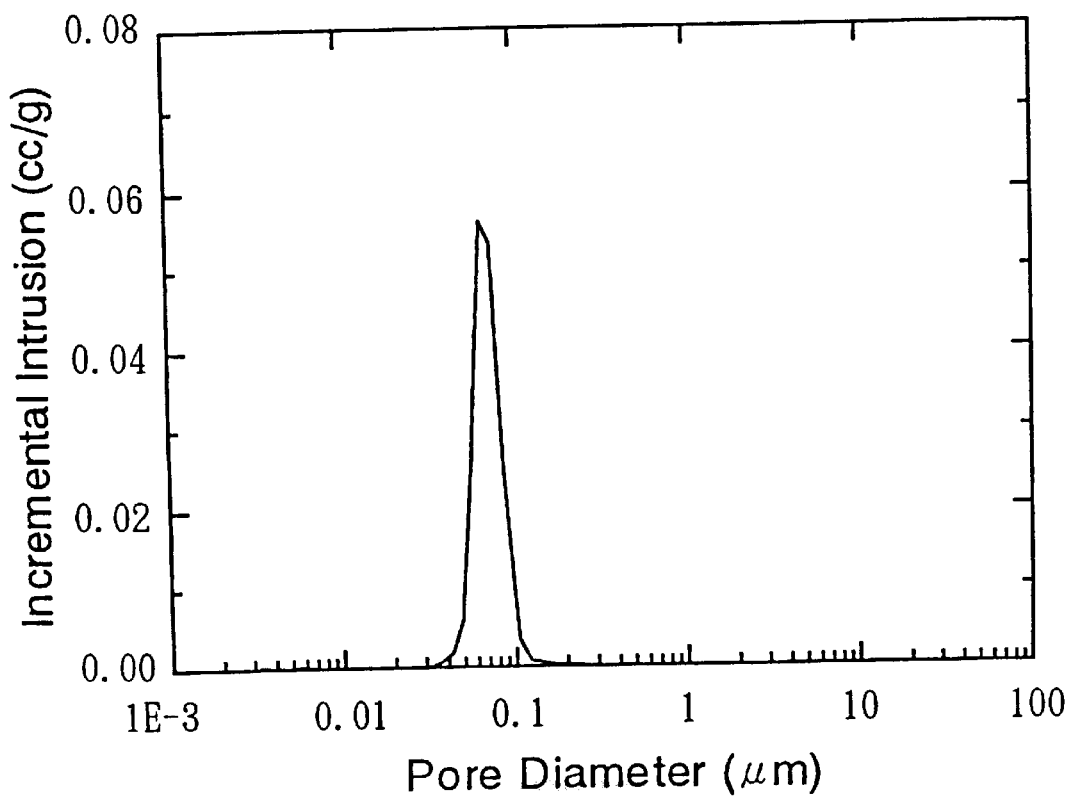
FIG. 3 shows the pore diameter distribution of sample No. 40 of the Comparative Example.

Alumina powder with a mean particle diameter of 0.2 µm (brand name TM-DAR, BET specific surface area of 13.6 m²/g) was molded at 30 MPa to obtain a molded article with dimensions of 55 mm×12 mm×5 mm. Relative density of the molded article was 53%. This molded article was placed in an electric furnace and heated to 800 to 1,000° C. at 10° C./minute to decompose the aluminum hydroxide and then further calcinated for 0 to 2 hours at 1,000 to 1,600° C. The composition of the alumina porous material sample that was obtained, sintering conditions, and determination results for each property are shown in Table 3. Moreover, the pore diameter distribution of sample No. 40 is shown in FIG. 3. The alumina from the present invention has only a peak pore diameter near 70 nm and there were almost no pores with a diameter of approximately 10 nm.

TABLE 3

| Sample | Sintering Temperature (° C.) | Porosity (%) | Specific Surface Area (m²/g) | Bending Strength (MPa) | Young's Modulus (GPa) |
|---|---|---|---|---|---|
| 40 | 1100 | 41 | 7.95 | 58.99 ± 18.83 | 59.97 |
| 41 | 1150 | 37 | 6.10 | 80.30 ± 19.42 | 95.33 |
| 42 | 1200 | 29 | 3.99 | 148.02 ± 20.62 | 139.38 |
| 43 | 1250 | 20 | 2.97 | 228.20 ± 49.08 | 223.35 |
| 44 | 1300 | 8 |  | 335.34 ± 102.66 | 337.45 |
| 45 | 1350 | 3 |  | 462.90 ± 46.09 | 381.82 |

Based on the results in above-mentioned Examples 1 and 2, the alumina porous material of the present invention has micropores with a pore diameter of 10 to 100 nm and a high porosity of 65%. Moreover, the pore diameter distribution has 2 peaks and therefore, it has a high specific surface area of 40 m²/g. Furthermore, since it has the α phase, it has relatively high strength. That is, a balance between high porosity and high specific surface area and high strength is possible because the α and θ phases are both present.

By means of the present invention, exceptional results are obtained in that (1) an α (+θ) alumina porous material with a high specific surface area, narrow pore distribution diameter, and excellent mechanical properties is obtained, and (2) a balance between high porosity and high specific surface area and high strength can be realized with this type of alumina porous material and therefore, it can be used as a filter, catalyst carrier, etc.

What is claimed is:

1. A method of producing an alumina porous material, the method comprising molding a mixed powder comprising alumina powder and Al(OH)$_3$ as a starting powder to form a molded article;

heating the molded article to decompose a portion of the Al(OH)$_3$; and further calcinating the molded article at a temperature in a range of from 1,000 to 1,600° C. to produce the alumina porous material, wherein the powder contains alumina as the main component, aluminum hydroxide, and, optionally, 1 to 20 volume % of zirconia.

2. The method according to claim 1, wherein the alumina powder in the mixed powder has a mean particle diameter in a range of from 0.05 to 2 µm.

3. The method according to claim 1, wherein the mixed powder comprises 10 to 90 volume % Al(OH)$_3$.

4. The method according to claim 3, wherein the Al(OH)$_3$ is a powder having a mean particle diameter of 2.0 µm or smaller.

5. The method according to claim 1, wherein the mixed powder further comprises 0 to 10 volume % zirconia powder.

6. The method according to claim 1, wherein the heating comprises heating the molded article to a temperature in a range of from 800 to 1,000° C. at a rate in a range of from 1 to 10° C./min.

7. The method according to claim 1, wherein the heating is in air.

* * * * *